United States Patent
Chen et al.

(10) Patent No.: US 11,329,774 B2
(45) Date of Patent: *May 10, 2022

(54) INTERFERENCE COORDINATION IN COMMUNICATION SYSTEMS WITH DYNAMIC SPECTRUM MANAGEMENT

(71) Applicant: MOTOROLA SOLUTIONS, INC., Chicago, IL (US)

(72) Inventors: Ethan Y. Chen, Wilmette, IL (US); Isam R. Makhlouf, Lake Zurich, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 144 days.

This patent is subject to a terminal disclaimer.

(21) Appl. No.: 16/802,424

(22) Filed: Feb. 26, 2020

(65) Prior Publication Data

US 2020/0195396 A1     Jun. 18, 2020

Related U.S. Application Data

(63) Continuation of application No. 16/148,899, filed on Oct. 1, 2018, now Pat. No. 10,680,769.

(51) Int. Cl.
*H04B 1/00* (2006.01)
*H04L 5/00* (2006.01)
(Continued)

(52) U.S. Cl.
CPC .......... *H04L 5/0032* (2013.01); *H04W 16/14* (2013.01); *H04W 72/14* (2013.01); *H04W 92/20* (2013.01)

(58) Field of Classification Search
None
See application file for complete search history.

(56) References Cited

U.S. PATENT DOCUMENTS

| 7,907,508 B2 | 3/2011 | Tao et al. |
| 8,891,645 B2 | 11/2014 | Karabinis |
(Continued)

FOREIGN PATENT DOCUMENTS

| WO | 2018031136 | 2/2018 | |
| WO | 2018172367 A1 | 9/2018 | |
| WO | WO-2018172367 A1 * | 9/2018 | ............ H04W 28/16 |

OTHER PUBLICATIONS

Kimura et al., "Inter-Cell Interference Coordination (ICIC) Technology," paper, Fujitsu Sci. Tech J., vol. 48, No. 1, pp. 89-94 (Jan. 2012).

(Continued)

*Primary Examiner* — Sithu Ko
(74) *Attorney, Agent, or Firm* — Michael Best & Friedrich LLP (57) ABSTRACT

Systems and methods for frequency spectrum interference coordination in communication systems with dynamically-assigned spectrum. Embodiments provided herein include a spectrum management entity proxy between a cellular network's base stations and the spectrum management entity. The spectrum management entity proxy determines and implements an interference coordination scheme between the base stations of the cellular network. To determine and implement the interference coordination scheme, the spectrum management entity proxy modifies the messages exchanged between one or more base stations and a spectrum management entity before forwarding the messages. In some embodiments, the spectrum management entity proxy generates request messages to the spectrum management entity on behalf of the base stations (and vice versa).

16 Claims, 5 Drawing Sheets

(51) Int. Cl.
*H04W 16/14* (2009.01)
*H04W 72/14* (2009.01)
*H04W 92/20* (2009.01)

(56) References Cited

U.S. PATENT DOCUMENTS

| | | | |
|---|---|---|---|
| 9,313,665 B2* | 4/2016 | El-Refaey | H04W 12/06 |
| 9,325,483 B2 | 4/2016 | Karsi et al. | |
| 9,973,933 B2* | 5/2018 | Mueck | H04W 16/14 |
| 10,492,233 B2* | 11/2019 | Das | H04W 4/24 |
| 10,536,859 B2* | 1/2020 | Gunasekara | H04W 16/14 |
| 2006/0083205 A1 | 4/2006 | Buddhikot et al. | |
| 2011/0176497 A1 | 7/2011 | Gopalakrishnan | |
| 2011/0249642 A1 | 10/2011 | Song et al. | |
| 2012/0281648 A1 | 11/2012 | Dahrouj et al. | |
| 2015/0057004 A1 | 2/2015 | Cheng et al. | |
| 2015/0119059 A1 | 4/2015 | Miao et al. | |
| 2015/0271829 A1 | 9/2015 | Amini et al. | |
| 2015/0326463 A1 | 11/2015 | Solondz | |
| 2016/0330743 A1* | 11/2016 | Das | H04W 72/0486 |
| 2017/0055193 A1* | 2/2017 | Mueck | H04W 84/042 |
| 2017/0311295 A1 | 10/2017 | Soldati et al. | |
| 2018/0288621 A1* | 10/2018 | Markwart | H04L 5/0035 |
| 2019/0223037 A1 | 7/2019 | Raghothaman | |
| 2019/0394704 A1* | 12/2019 | Lou | H04W 16/14 |
| 2021/0153029 A1* | 5/2021 | Mueck | H04W 16/14 |

OTHER PUBLICATIONS

Wireless Innovation Forum (WINNF), "Signaling Protocols and Procedures for Citizens Broadband Radio Service (CBRS): Spectrum Access System (SAS)—Citizens Broadband Radio Service Device (CBSD) Interface Technical Specification," document WINNF-TS-0016, version V1.2.1, Jan. 3, 2018, The Software Defined Radio Forum Inc. (60 pages).

International Search Report and Written Opinion dated Dec. 16, 2019 for related International Application No. PCT/US2019/053069 (16 pages).

Winn Forum: "Interim SAS to CBSD Protocol Technical Report—A Historical Document WINNF-15-H-0023 Spectrum Sharing Committee Work Group 3 (Protocols) SAS to CBSD Protocol Terms, Conditions & Notices" Jan. 3, 2017, XP055650788, Retrieved from the Internet: URL://www.wirelessinnovation.org/assets/Historical/winnf-15-h-0023-v1.0.0%20interim%20sas%20cbsd%20protocol%20technical%20report-a.pdf (retrieved from the Internet Dec. 9, 2019) Sections 5 and 6.4.

Winn Forum: "SAS to CBSD Protocol Spectrum Sharing Committee Work Group 3 (Protocols) SAS to CBSD Protocol Terms, Conditions & Notices" Jan. 3, 2017, XP055650792, Retrieved from the Internet: URL://www.wirelessinnovation.org/assets/Historical/winnf-15-h-0023-v1.0.0%20sas%20to%20cbsd20%protocol%20technical%20report-b.pdf (retrieved from the Internet Dec. 9, 2019) sections 5.3 and 5.4.

\* cited by examiner

FIG. 5

INTERFERENCE COORDINATION IN COMMUNICATION SYSTEMS WITH DYNAMIC SPECTRUM MANAGEMENT

RELATED APPLICATIONS

The present patent application is a continuation of U.S. application Ser. No. 16/148,899, filed Oct. 1, 2018, the entire contents of which is hereby incorporated by reference.

BACKGROUND OF THE INVENTION

Some portions of the radio frequency spectrum reserved for wireless communications are shared and allocated dynamically among system operators by a spectrum management entity. For example, the Citizens Broadband Radio Service (CBRS) dynamically allocates spectrum to Long-Term Evolution (LTE) systems in the 3.5 GHz band. In an LTE network where operating channels are dynamically assigned, the network's base stations may be allocated different channels over time. Frequency reuse is adopted in LTE networks to achieve higher spectral efficiency. To reduce inter-cell interference, higher order frequency reuse (that is, a reuse factor greater than one) or inter-cell interference coordination (ICIC) may be used.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Cellular (for example, Long-Term Evolution (LTE)) networks operate to provide wireless communications to user equipment using designated frequency bands. In order to meet the need for higher data rates and to improve spectral efficiency of the assigned bands, frequencies are re-used within a cellular network or among neighboring networks. Frequency reuse is configured based on the location and propagation characteristics for the base stations in the cellular network. Dense frequency (e.g. single frequency) reuse can lead to inter-cell interference. As a consequence, cellular networks implement inter-cell interference coordination (ICIC) to reduce interference, especially for users operating near the edges of the cells. In some networks, higher order frequency reuse can be used to reduce interference or utilize larger spectrum allocations. In some cases, a combination of approaches is used.

Demand for wireless communications services is increasing, but available spectrum for allocation to cellular systems is limited. As a consequence, some portions of the existing radio frequency spectrum allocated for other use are shared with cellular systems, and allocated dynamically among the systems by a spectrum management entity. This allows for more efficient use of underutilized spectrum. For example, the Citizens Broadband Radio Service (CBRS) dynamically allocates spectrum in the 3.5 GHz band to cellular systems. In such systems, the base stations request allocations from a spectrum management entity, i.e., SAS (Spectrum Access System), which grants allocations to the base stations according to pre-defined criteria. Dynamic spectrum allocations are temporary, and may change according to a schedule, or unexpectedly. For example, spectrum allocations may be revoked based on user priority, among other reasons.

ICIC schemes for communication systems are configured taking into account, among other things, the frequency ranges allocated to the base stations, the coordinates (latitude, longitude, and elevation) of the base stations, the transmitter power of the base stations, and the characteristics of the radio frequency propagation environment of the cells served by the base stations. When frequency allocations remain static, the ICIC configurations may also remain static. However, the addition of new base stations or changes in frequency allocations within an existing network may require the reconfiguration of the existing ICIC scheme.

To address this problem, some base stations implement dynamic ICIC schemes. Such base stations communicate using existing signaling links between base stations (for example, the LTE-standard ×2Application Protocol (×2AP) interface). However, dynamic ICIC schemes require extremely low transport latency and very complex coordinated scheduling of often bursty and unpredictable broadband traffic, and can result in high signaling overhead. Accordingly, systems and methods are provided herein for, among other things, frequency spectrum interference coordination in communication systems with dynamically-assigned spectrum.

Embodiments provided herein include a spectrum management entity proxy between a cellular network's base stations and the spectrum management entity. The spectrum management entity proxy determines and implements an interference coordination scheme between the base stations of the cellular network. To determine and implement the interference coordination scheme, the spectrum management entity proxy modifies the messages exchanged between one or more base stations and a spectrum management entity before forwarding the messages. In some embodiments, the spectrum management entity proxy generates request messages to the spectrum management entity on behalf of the base stations (and vice versa). For example, two base stations in a network may each request 10 MHz of spectrum. If the cellular network uses a hard frequency reuse scheme, the spectrum management entity proxy will send only a single request for a 10 MHz spectrum allocation, rather than forwarding on two separate requests for 10 MHz each. When the spectrum management entity proxy receives the spectrum allocation, it forwards the same spectrum allocation to each base station. In another example, the cellular network operates using a soft frequency reuse scheme (for example, fractional frequency reuse), so the spectrum management entity proxy requests a 10 MHz spectrum allocation on behalf of each of the base stations. After receiving the two 10 MHz spectrum allocations from the spectrum management entity, the spectrum management entity proxy adds soft frequency reuse configuration information to the grant messages before forwarding the spectrum allocations to the base stations.

In some embodiments, the spectrum management entity proxy generates unsolicited response messages to the spectrum management entity on behalf of the base stations (and vice versa). For example, the spectrum management entity proxy may determine a new inter-cell interference coordination configuration for the cellular network (for example, because a new base station comes online), and generate a message to one or more base stations revoking their spectrum allocations, granting new allocations, or updating their interference coordination scheme configurations.

In some embodiments, the spectrum management entity proxy delays or reorders the messages exchanged between one or more base stations and a spectrum management entity before forwarding the messages. For example, the spectrum management entity proxy may receive spectrum requests from multiple base stations, but delay forwarding some of the requests until the spectrum allocations and interference coordination scheme configurations for other base stations are determined.

Embodiments presented herein also receive performance metrics for the base stations, and modify the interference coordination scheme configurations based on the performance metrics. For example, the loading statistics or sensed interference for a base station may prompt the spectrum management entity proxy to make a request for more spectrum from the spectrum management entity, determine new spectrum allocations and interference coordination scheme configurations for the base station, for other base stations in the cellular network, or both. The spectrum management entity proxy sends new allocations and configurations to the affected base stations, for example, by sending messages suspending the current spectrum allocations for the base stations.

Embodiments described herein may be used to configure inter-cell interference coordination for one or more cellular networks, while avoiding the complexity of a decentralized implementation within the base stations. Using such embodiments, the spectrum management entity proxy intercepts the one-to-one communications between individual base stations in one or more cellular networks and a spectrum management entity. Rather than simply forwarding all of the one-to-one messages individually, the spectrum management entity proxy considers the configurations of and communications from all of the base stations, modifying messages and sending unsolicited messages to achieve a desired configuration for the cellular network as a whole. Such embodiments enable dynamic configuration of inter-cell interference coordination without using inter-base station signaling links, reducing the overhead of such links. Such embodiments also enable coordination between neighboring cellular networks, where base stations are not linked.

Embodiments described herein therefore result in reduced radio frequency interference in communication systems that operate using dynamically allocated spectrum, more efficient use of spectrum and network resources, and improved operation of the communication systems for users.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
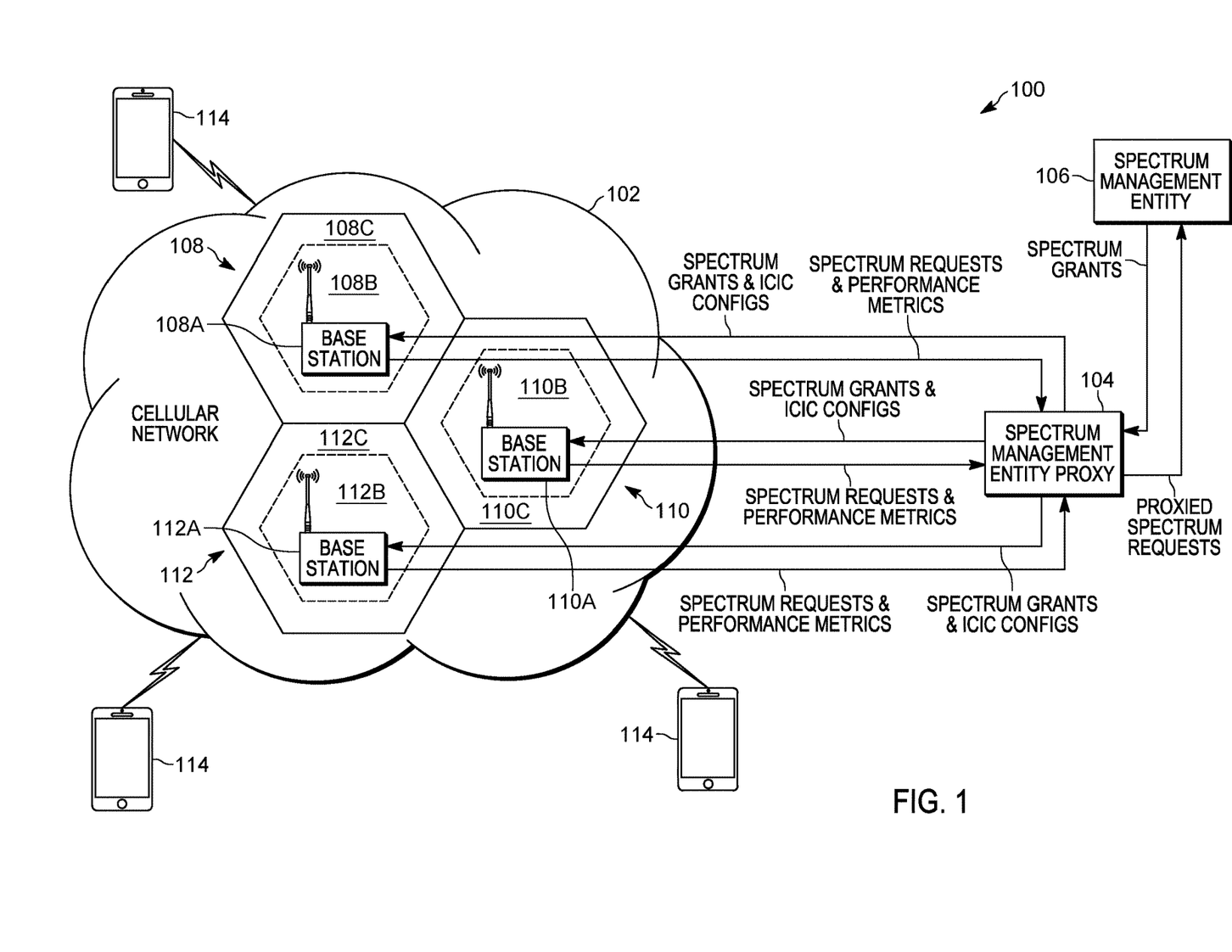
FIG. 1 is a diagram of a radio frequency spectrum interference coordination system, in accordance with some embodiments.

FIG. 1 illustrates an example radio frequency spectrum interference coordination system 100. The system 100 includes a cellular network 102, a spectrum management entity proxy 104, and a spectrum management entity 106. The illustrated components are communicatively coupled, for example, using one or more additional communications networks or links (not shown). For example, the spectrum management entity proxy 104 and the spectrum management entity 106 may communicate over a wide area network (WAN) (for example, a transport control protocol/internet protocol (TCP/IP)-based network), a local area network (for example, a Wi-Fi or Ethernet network), a wireless network, and combinations or derivatives thereof.

The cellular network 102 includes cells 108, 110, 112, each of which provides wireless communications service to a particular geographic area. The cells 108, 110, 112 provide wireless communication services to wireless communication devices 114. In some embodiments, the wireless communication devices 114 are smart telephones. Each of the cells 108, 110, 112 includes a base station 108A, 110A, 112A, respectively. In some embodiments, the cellular network 102 is an LTE network, and each of the base stations 108A, 110A, 112A is an LTE Evolved Node B (eNodeB).

The base stations 108A, 110A, 112A, described more particularly below with respect to FIG. 2, operate to provide communications to and from the wireless communication devices 114 using fixed radio frequency spectrum allocations, dynamically-allocated radio frequency spectrum, or a combination of both. As illustrated in FIG. 1, the base stations 108A, 110A, 112A send spectrum requests to the spectrum management entity proxy 104. As described more particularly below, the spectrum management entity proxy 104 requests and receives spectrum allocations from the spectrum management entity 106. The spectrum management entity proxy 104 communicates spectrum grants to the base stations 108A, 110A, 112A based on the spectrum allocations received from the spectrum management entity 106. Some embodiments include more than one cellular network. In such embodiments, the spectrum management entity proxy 104 operates as described herein with respect to the base stations for each of the multiple cellular networks.

As noted, the cellular systems employing frequency reuse may need to implement inter-cell interference coordination schemes. As described more particularly below, embodiments of the spectrum management entity proxy 104 determine inter-cell interference coordination configurations and send them to one or more of the base stations 108A, 110A, 112A. As illustrated in FIG. 1, each of the cells 108, 110, 112 has a cell center 108B, 110B, 112B and a cell edge 108C, 110C, 112C. Depending on the inter-cell interference coordination configurations of the base stations, the cell centers and cell edges may vary in size and operational frequency band.

While operating, the base stations 108A, 110A, 112A collect performance metrics on themselves and communicate the metrics to the spectrum management entity proxy 104, which uses the metrics to, among other things, determine the inter-cell interference coordination configurations for the base stations 108A, 110A, 112A.

In some embodiments, the base stations 108A, 110A, 112A, the spectrum management entity proxy 104, and the spectrum management entity 106 operate according to the Citizens Broadband Radio Service (CBRS) standard developed by the Wireless Innovation Forum (WInnForum). In such embodiments, spectrum management entity proxy 104 is or includes a CBRS Spectrum Access System (SAS) Domain Proxy, the spectrum management entity 106 is a Spectrum Access System (SAS), and the base stations 108A, 110A, 112A are CBRS Devices (CBRSDs).

Although embodiments are described herein in terms of a CBRS shared spectrum system, this is by way of example only. It should be noted that the embodiments presented may be used with communication systems having dynamic spectrum management that operates according to other standards.

Figure 2:
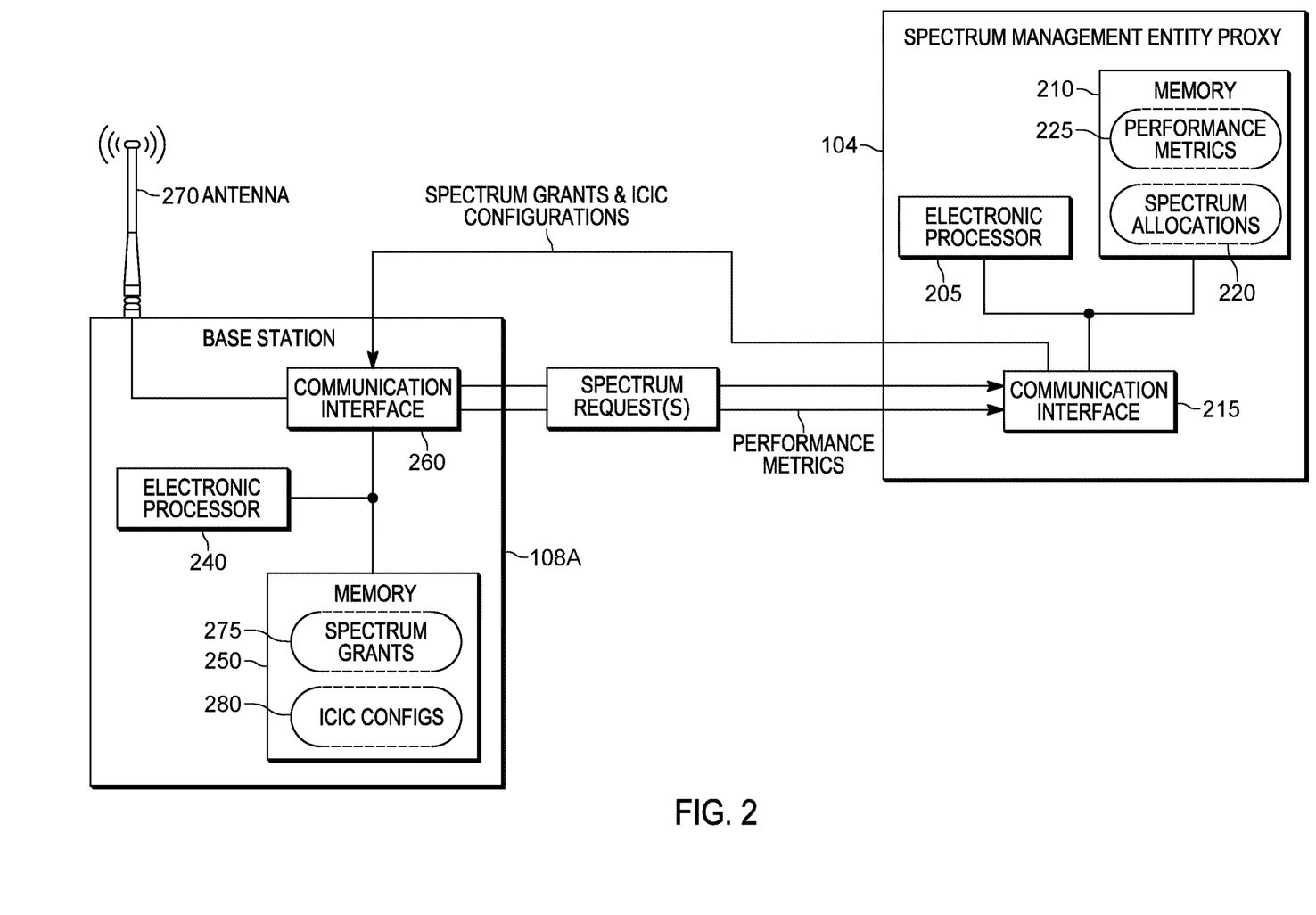
FIG. 2 is a diagram of a spectrum management entity proxy included in the communication system of FIG. 1, in accordance with some embodiments.

FIG. 2 schematically illustrates an example spectrum management entity proxy 104 and an example base station 108A more detail.

In the embodiment illustrated, the spectrum management entity proxy 104 includes an electronic processor 205, a memory 210, and a communication interface 215. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 205 may include one or more microprocessors, an application-specific integrated circuit (ASIC), or another suitable electronic device. The electronic processor 205 is configured to obtain and provide information (for example, from the memory 210 and/or the communication interface 215), and process the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein. The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, spectrum allocations 220 and performance metrics 225 for the base stations 108A, 110A, 112A.

The communication interface 215 is configured to receive input and to provide system output. The communication interface 215 includes hardware for communicating over one or more wired or wireless communication networks or connections with, for example, the base stations 108A, 110A, 112A and the spectrum management entity 106. For example, in some embodiments, the communication interface 215 includes at least one transceiver. In some embodiments, the transceivers are combined transmitter-receiver components. In other embodiments, the transceivers include separate transmitter and receiver components. The electronic processor 205 is configured to control the communication interface 215 to transmit and receive data to and from, for example, the base stations 108A, 110A, 112A and the spectrum management entity 106. In some embodiments, communications with the base stations 108A, 110A, 112A and the spectrum management entity 106 occur via distinct logical or physical interfaces. The electronic processor 205 and the communication interface 215 may include various digital and analog components, which for brevity are not described herein and which may be implemented in hardware, software, or a combination of both.

In the example provided, the base station 108A includes an electronic processor 240, a memory 250, and a communication interface 260. The electronic processor 240, the memory 250, and the communication interface 260 communicate over one or more communication lines or buses, wirelessly, or a combination thereof. These components are similar to those described above with respect to the spectrum management entity proxy 104, and perform similar functions. For example, the electronic processor 240 executes instructions stored in the memory 250 to implement functionality of the base station 108A, such as to control the communication interface 260 to transmit and receive digital radio signals to and from, for example, the wireless communication devices 114 using the antenna 270. In the embodiment illustrated, the memory 250 also stores, among other things, spectrum grants 275 and inter-cell interference coordination configurations 208 received from the spectrum management entity proxy 104.

As noted, shared spectrum systems (for example, the system 100) assign channels to base stations from a dynamically-allocated spectrum pool. When frequency allocations are changed, the inter-cell interference coordination configurations for the base stations may also need to change to continue preventing radio frequency interference between cells.

Figure 3:
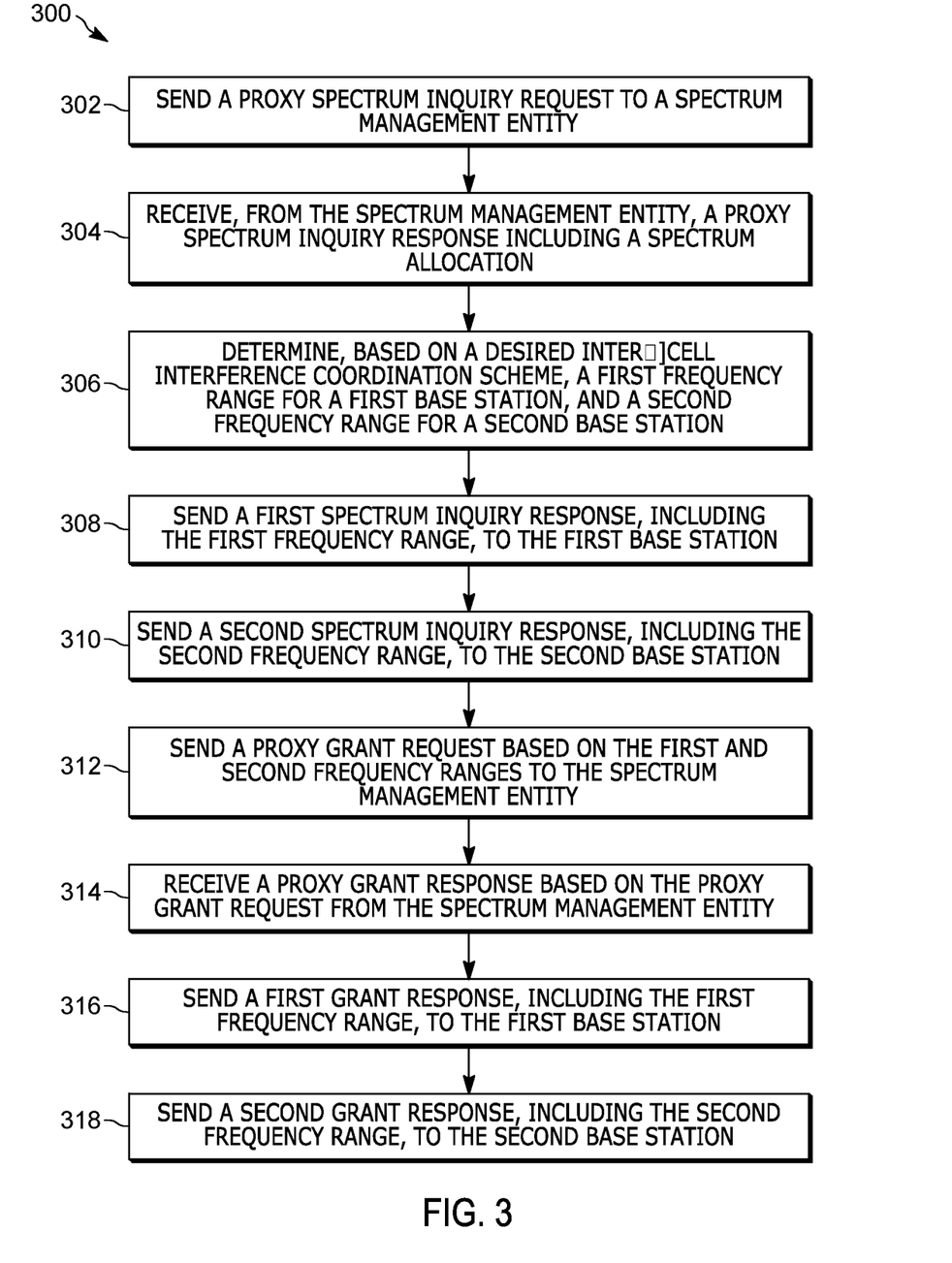
FIG. 3 is a flowchart of a method for operating the spectrum management entity proxy of FIG. 1 using a hard frequency reuse scheme, in accordance with some embodiments.

FIG. 3 illustrates an example method 300 for frequency spectrum interference coordination in communication systems with dynamically-assigned spectrum and higher-order frequency reuse schemes. The method 300 is described as being performed by the spectrum management entity proxy 104 and, in particular, the electronic processor 205. However, it should be understood that in some embodiments, portions of the method 300 may be performed by other devices, including for example, the base stations 108A, 110A, 112A. While FIG. 1 illustrates three base stations 108A, 110A, 112A, it should be understood that embodiments of the method 300 may be used to dynamically assign spectrum and implement inter-cell interference coordination for more or fewer base stations and communication devices than illustrated. Embodiments may also include more than one spectrum management entity proxy 104 or spectrum management entity 106.

As illustrated in FIG. 3, at block 302, the electronic processor 205 sends a proxy spectrum inquiry request to the spectrum management entity 106 via the communication interface 215. A proxy spectrum inquiry request is, for example, a network message that includes a request for information on available radio frequency spectrum from the spectrum management entity 106. In some embodiments, the proxy spectrum inquiry request is based on a spectrum inquiry request received from one or more of the base stations 108A, 110A, 112A. For example, the spectrum management entity proxy 104 may receive a first spectrum inquiry request from the first base station and a second spectrum inquiry request from the second base station. Because the spectrum management entity proxy 104 is assigning spectrum to the cellular network to reduce inter-cell interference, it does not forward both requests to the spectrum management entity 106, but instead sends a single proxy spectrum inquiry request in response to receiving the first and second spectrum inquiry requests.

At block 304, the electronic processor 205 receives, from the spectrum management entity 106 via the communication interface 215, a proxy spectrum inquiry response. The proxy spectrum inquire response is, for example, a network message including an available spectrum allocation. The spectrum allocation includes an allocation frequency range. For example, the response may indicate a spectrum allocation available with an allocation frequency range of 20 MHz.

At block 306, the electronic processor 205 determines a first frequency range for the first base station and a second frequency range for the second base station. The first and second frequency ranges are determined based on a desired inter-cell interference coordination scheme for the cellular network. In some embodiments, the desired inter-cell interference coordination scheme is a hard frequency reuse pattern (for example, having a frequency reuse factor of two or greater). The electronic processor 205 determines the first and second frequency ranges based on the coordinates (latitude, longitude, and elevation) of the base stations, the transmitter power of the base stations, and the characteristics of the radio frequency propagation environment of the cells served by the base stations. The determined first and second frequency ranges are distinct from each other and bounded by the allocation frequency range. That is, each of the first and second frequency ranges is a portion of the allocation frequency range. For example, the electronic processor 205 may determine that the first frequency range is the first 10 MHz of the 20 MHz allocation frequency range, and that the second frequency range is the second 10 MHz of the 20 MHz allocation frequency range. It should be noted that the first and second frequency ranges, while each a portion of the allocation frequency range, may not combine to total the allocation frequency range. The spectrum management entity proxy 104 may reserve some of the allocation frequency range for assignment to other base stations.

At block 308, the electronic processor 205 sends a first spectrum inquiry response to the first base station via the communication interface 215. The first spectrum inquiry response is, for example, a network message that includes the first frequency range and indicates to the first base station that this frequency range is available to it.

At block 310, the electronic processor 205 sends a second spectrum inquiry response to the second base station via the communication interface 215. The second spectrum inquiry response is, for example, a network message that includes the second frequency range and indicates to the second base station that this frequency range is available to it.

The first and second base stations respond to the spectrum inquiry responses by requesting that the available spectrum is granted to them. For example, the spectrum management entity proxy 104 may receive the receive a first grant request for the first frequency range from the first base station and a second grant request for the second frequency range from the second base station. As with the spectrum inquiry requests, the spectrum management entity proxy 104 does not forward both grant requests to the spectrum management entity 106. Instead, at block 312, the electronic processor 205, in response to receiving the first and second grant requests, sends a proxy grant request based on the first and second frequency ranges to the spectrum management entity 106 via the communication interface 215. The proxy grant request is, for example, a network message requesting that the spectrum management entity 106 grant the spectrum allocation, which it earlier indicated was available (at block 304).

At block 314, the electronic processor 205 receives a proxy grant response based on the proxy grant request from the spectrum management entity 106 via the communication interface 215. The proxy grant response is, for example, a network message granting the spectrum allocation for use by the cellular network.

The spectrum management entity proxy 104, having received the proxy grant response, assigns portions of the spectrum to the requesting base stations, based on the desired inter-cell interference coordination scheme, as noted above. At block 316, the electronic processor 205 sends a first grant response, including the first frequency range, to the first base station via the communication interface 215. At block 318, the electronic processor 205 sends a second grant response, including the second frequency range, to the second base station via the communication interface 215.

As noted above, the spectrum management entity proxy 104 may send unsolicited messages to the base stations. For example, in some embodiments, the electronic processor 205 determines whether one or more of the base stations operating in the cellular network should be reconfigured. In response to making such a determination, the electronic processor 205 sends a grant suspend message to the base station or base stations needing reconfiguration. A grant suspend message is, for example, a network message indicating that the grant of a frequency range to the base station is being suspended for a time or revoked. In some embodiments, the grant suspend message may include a suggestion to the base station that it request a particular alternative spectrum allocation. In some embodiments, the grant suspend message is, or is included in, a network message sent to the base station as part of a heartbeat procedure that ordinarily occurs between the base stations and the spectrum management entity 106.

In some embodiments, the electronic processor 205 determines that one or more of the base stations operating in the cellular network should be reconfigured based on performance metrics received for a plurality of base stations that includes the base stations under consideration. For example, the spectrum management entity proxy 104 may receive performance metrics for all base stations in three cellular networks. However, it may only provide spectrum and inter-cell interference coordination to the base stations for a single cellular network or a portion of a cellular network. One example of a performance metric is a loading statistic for a base station. Loading statistics measure how busy a base station is related to its capacity, and include, for example, the number of idle users, the number of active users, the number of users transitioning from idle to active for a push-to-talk group call, and the distribution of resource block utilization within a cell center or cell edge. If the performance metrics indicate, for example, that one base station is heavily loaded while another is not, the spectrum management entity proxy 104 may reconfigure the spectrum allocations and the inter-cell interference coordination configurations for the base stations to allow the busier base station to handle more user capacity. Another example of a performance metric is a time division duplexing configuration (for example, the frame structures and subframe formats). Another example of a performance metric is channel interference (that is, an indication of interference on one or more channels). For example, when a base station is experience interference on a channel despite the current inter-cell interference coordination configuration, e.g. from external sources, it may need to be assigned different spectrum to reduce the interference.

In some embodiments, the electronic processor 205 determines that one or more of the base stations operating in the cellular network should be reconfigured when it receives a spectrum inquiry request. In the example above, a third base station may be added to first and second base stations, and the electronic processor 205 receives a third spectrum inquiry request from the third base station via the communication interface 215. The spectrum management entity proxy 104 may not have sufficient spectrum granted from the spectrum management entity 106 to fulfill the inquiry request. In such case, the electronic processor 205 sends a second proxy spectrum inquiry request, based on the third spectrum inquiry request, to the spectrum management entity 106. The electronic processor 205 receives, from the spectrum management entity 106, a second proxy spectrum inquiry response including a second spectrum allocation.

The spectrum management entity proxy 104, having determined that it has sufficient spectrum, or having requested additional spectrum for use, assigns portions of the spectrum to the requesting base station, based on the desired inter-cell interference coordination scheme, as noted above. The electronic processor 205 determines a third frequency range for a third base station. In some embodiments, the electronic processor 205 determines new or updated frequency ranges for the first and second base stations, for example, based on the third frequency range, the desired inter-cell interference coordination scheme, the location of the first base station, the location of the second base station, the location of the third base station, or combinations of the foregoing. The electronic processor 205 sends a third spectrum inquiry response, including the third frequency range, to the third base station. As noted above, the electronic processor 205 sends, if necessary, the first and second base stations their new or updated frequency ranges by sending grant suspend messages.

Figure 4:
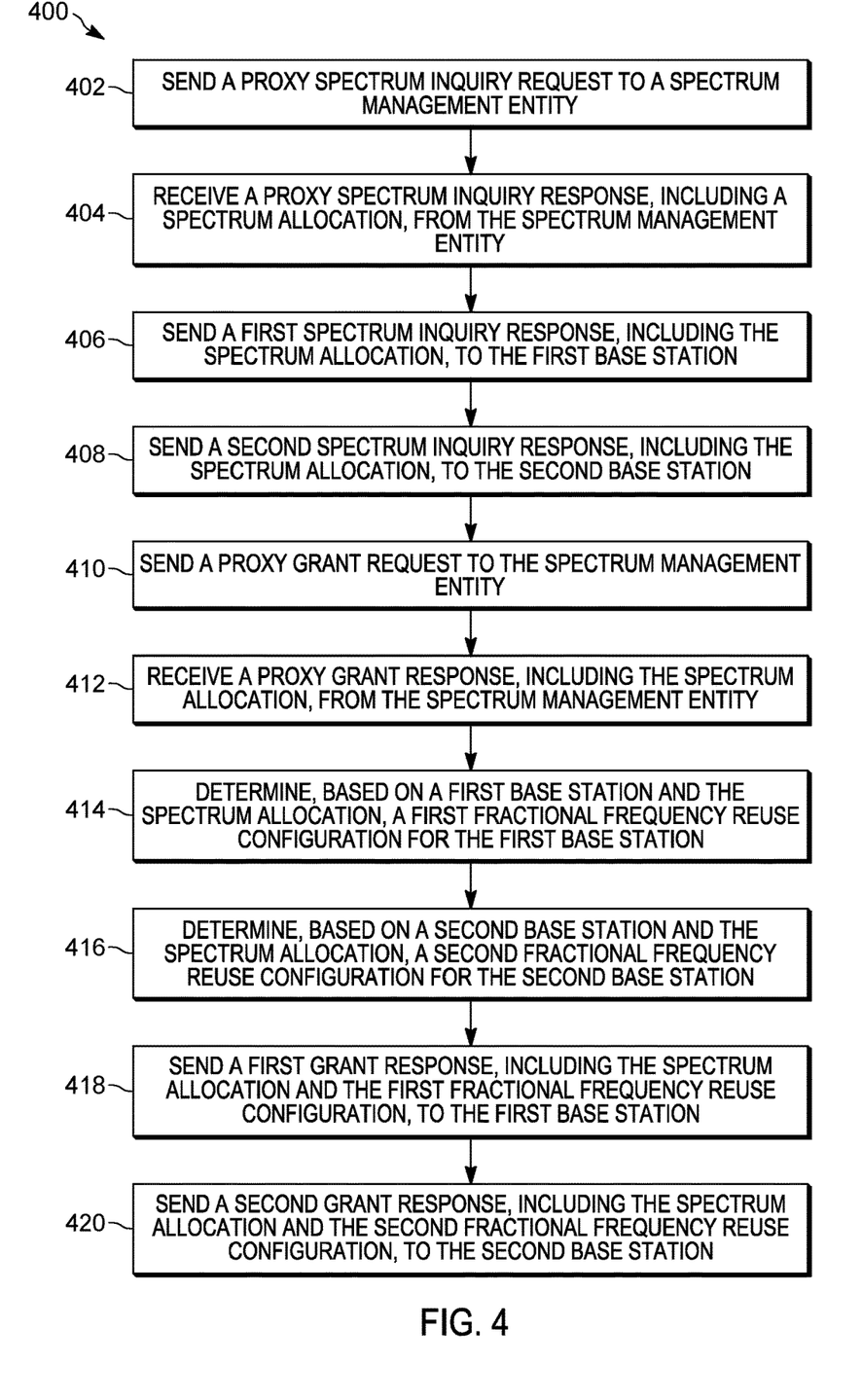
FIG. 4 is a flowchart of a method for operating the spectrum management entity proxy of FIG. 1 using a fractional frequency reuse scheme, in accordance with some embodiments.

Some cellular networks operate using fractional frequency reuse scheme for inter-cell interference coordination. Fractional frequency reuse provides one frequency range for use at the cell center, and others for use at the cell edge. Accordingly, FIG. 4 illustrates a method 400 for fractional frequency reuse spectrum interference coordination in communication systems using a fractional frequency reuse scheme with dynamically-assigned spectrum. The method 400 is described as being performed by the spectrum management entity proxy 104 and, in particular, the electronic processor 205. However, it should be understood that in some embodiments, portions of the method 400 may be performed by other devices, including for example, the base stations 108A, 110A, 112A. While FIG. 1 illustrates three base stations 108A, 110A, 112A, it should be understood that embodiments of the method 400 may be used to dynamically assign spectrum and implement inter-cell interference coordination for more or fewer base stations and communication devices than illustrated. Embodiments may also include more than one spectrum management entity proxy 104 or spectrum management entity 106.

As illustrated in FIG. 4, at block 402, the electronic processor 205 sends, via the communication interface 215, a proxy spectrum inquiry request to the spectrum management entity 106, for example, as described above with respect to the method 300.

At block 404, the electronic processor 205 receives, via the communication interface 215, a proxy spectrum inquiry response, including a spectrum allocation, from the spectrum management entity 106, for example, as described above with respect to the method 300.

At block 406, the electronic processor 205 sends a first spectrum inquiry response, including the spectrum allocation, to the first base station, for example, as described above with respect to the method 300.

At block 408, the electronic processor 205 sends a second spectrum inquiry response, including the spectrum allocation, to the second base station, for example, as described above with respect to the method 300.

At block 410, the electronic processor 205 sends a proxy grant request to the spectrum management entity, for example, as described above with respect to the method 300.

At block 412, the electronic processor 205 receives a proxy grant response, including the spectrum allocation, as described above with respect to the method 300.

Because the cellular network in this example operates according to a fractional frequency reuse scheme, at block 414, the electronic processor 205 determines, with an electronic processor, based on a first base station and the spectrum allocation, a first fractional frequency reuse configuration for the first base station. For example, the electronic processor 205 determines a cell center definition, a cell edge definition, and a cell edge resource allocation for the first base station based on, for example, its location, the frequency range of the spectrum allocation, and the radio frequency propagation characteristics of the area surrounding the first base station.

Similarly, at block 416, the electronic processor 205 determines, with the electronic processor, based on a second base station and the spectrum allocation, a second fractional frequency reuse configuration for the second base station.

At block 418, the electronic processor 205 sends a first grant response to the first base station. The first grant response is, for example, a network message including the spectrum allocation and the first fractional frequency reuse configuration.

At block 402, the electronic processor 205 sends a second grant response to the second base station. The second grant response is, for example, a network message including the spectrum allocation and the second fractional frequency reuse configuration.

In some embodiments, the electronic processor 205 may receive a third spectrum inquiry request from a third base station when the third base station comes online. Because the cellular network in this example operates according to a fractional frequency reuse scheme, the third base station may also be assigned the same spectrum allocation as the first and second base stations. However, the third base station also operates using fractional frequency reuse. Accordingly, responsive to receiving the third spectrum inquiry request, the electronic processor 205 determines, based on the third base station and the spectrum allocation, a third fractional frequency reuse configuration for the third base station. The addition of the third base station may impact the operation of the first and second base stations.

As a consequence, the electronic processor 205 determines whether the first base station, the second base station, or both should be reconfigured. The electronic processor 205 makes this determination based on the first fractional frequency reuse configuration, the second fractional frequency reuse configuration, the third fractional frequency reuse configuration, the location of the first base station, the location of the second base station, the location of the third base station. In response to making such a determination, the electronic processor 205 sends a grant suspend message to the base station or base stations needing configuration. The grant suspend message is, for example, a network message including an updated fractional frequency reuse configuration.

Figure 5:
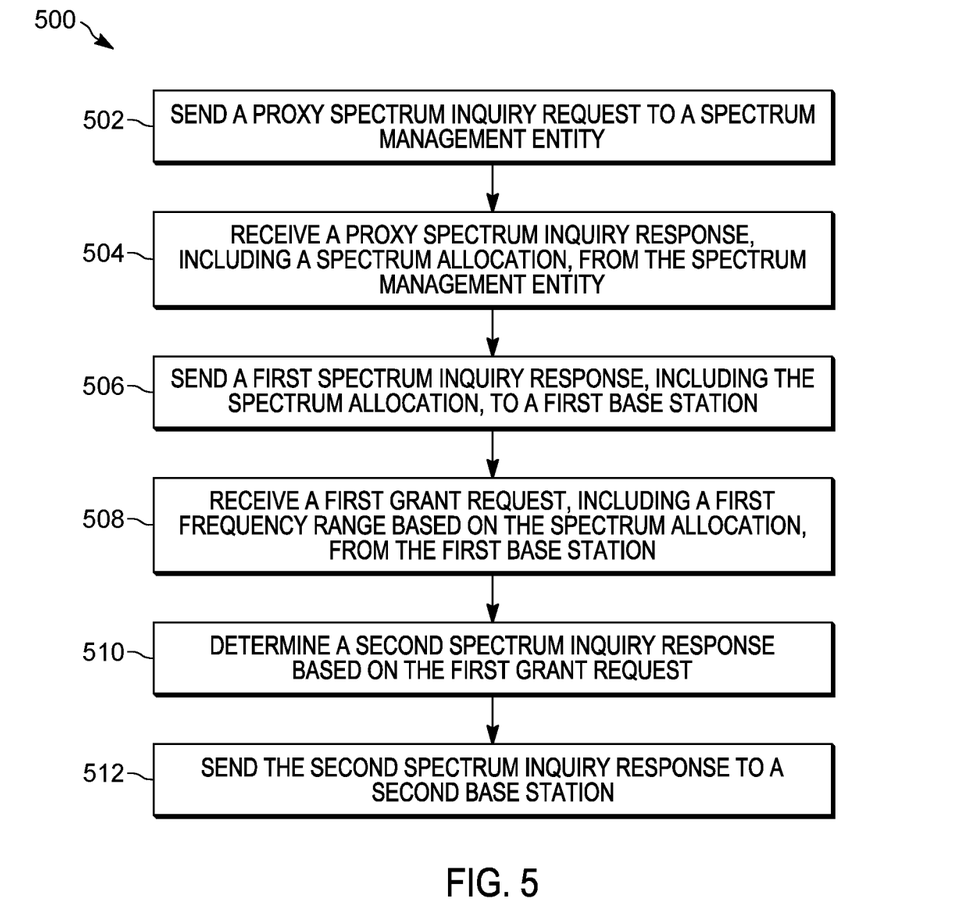
FIG. 5 is a flowchart of a method for operating the spectrum management entity proxy of FIG. 1 using a combined frequency reuse scheme, in accordance with some embodiments.

FIG. 5 illustrates an example method 500 for frequency spectrum interference coordination in communication systems using a combined frequency reuse scheme with dynamically-assigned spectrum. The method 500 is described as being performed by the spectrum management entity proxy 104 and, in particular, the electronic processor 205. However, it should be understood that in some embodiments, portions of the method 500 may be performed by other devices, including for example, the base stations 108A, 110A, 112A. While FIG. 1 illustrates three base stations 108A, 110A, 112A, it should be understood that embodiments of the method 500 may be used to dynamically assign spectrum and implement inter-cell interference coordination for more or fewer base stations and communication devices than illustrated. Embodiments may also include more than one spectrum management entity proxy 104 or spectrum management entity 106.

As illustrated in FIG. 5, at block 502, the electronic processor 205 sends a proxy spectrum inquiry request to a spectrum management entity 106 via the communication interface 215, as described above with respect to the method 300. In this example, the proxy spectrum inquiry request is based on a spectrum inquiry request received from two of the base stations 108A, 110A, 112A. The spectrum management entity proxy 104 receives a first spectrum inquiry request from the first base station and a second spectrum inquiry request from the second base station. As noted above, the spectrum management entity proxy 104 does not forward both requests to the spectrum management entity 106, but instead sends a single proxy spectrum inquiry request in response to receiving the first and second spectrum inquiry requests.

At block 504, the electronic processor 205 receives a proxy spectrum inquiry response, including a spectrum allocation, from the spectrum management entity 106, as described above with respect to the method 300. Rather than divide the spectrum among the two base stations, or offer the entire allocation to both base stations, the spectrum management entity proxy 104 offers the entire allocation to the first base station.

At block 506, the electronic processor 205 sends a first spectrum inquiry response, including the spectrum allocation, to a first base station, as described above with respect to the method 300.

At block 508, the electronic processor 205 receives a first grant request from the first base station, as described above with respect to the method 300. The first grant request includes a first frequency range based on the spectrum allocation.

At this stage, the first base station has chosen a portion of the spectrum allocation. At block 510, the electronic processor 205 determine a second spectrum inquiry response based on the first grant request, and sends (at block 512) the second spectrum inquiry response to a second base station. The second spectrum inquiry response offers the remaining spectrum allocation to the second base station. In some embodiments, the electronic processor 205 determines a second frequency range based on the first frequency range and the spectrum allocation, and includes the second frequency range in the second spectrum inquiry response. For example, where the spectrum allocation is 30 MHz and the first frequency range is the first 10 MHz, the electronic processor 205 selects the second frequency range from the remaining 20 MHz.

In some embodiments, the same spectrum may be assigned to both the first and second base stations (for example, the spectrum allocation is limited, or the desired inter-cell interference coordination scheme is a hybrid of hard frequency reuse and fractional frequency reuse). In such embodiments, the electronic processor 204 determines a fractional frequency reuse configuration for the second base station based on the first frequency range, and the second spectrum inquiry response includes the first frequency range and the fractional frequency reuse configuration.

In some embodiments of the method 500, the electronic processor 205 determines whether one or more of the base stations operating in the cellular network should be reconfigured. In response to making such a determination, sends a grant suspend message to the base station or base stations needing configuration, as described above with respect to the method 300.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains ... a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A radio frequency spectrum interference coordination system comprising:
    a communication interface; and
    an electronic processor, coupled to the communication interface and configured to
        send a proxy spectrum inquiry request to a spectrum management entity via the communication interface;
        receive a proxy spectrum inquiry response, including a spectrum allocation, from the spectrum management entity via the communication interface;
        send a first spectrum inquiry response, including the spectrum allocation, to a first base station via the communication interface;
        receive a first grant request, including a first frequency range based on the spectrum allocation, from the first base station via the communication interface;
        determine a second spectrum inquiry response based on the first grant request; and
        send the second spectrum inquiry response to a second base station via the communication interface;
    wherein the electronic processor is further configured to
        determine a second frequency range based on the first frequency range and selected from the spectrum allocation; and
    wherein the second spectrum inquiry response includes the second frequency range.

2. The system of claim 1, wherein the electronic processor is further configured to:
    determine a fractional frequency reuse configuration for the second base station based on the first frequency range; and
    wherein the second spectrum inquiry response includes the first frequency range and the fractional frequency reuse configuration.

3. The system of claim 1, wherein the electronic processor is further configured to:
    receive a first spectrum inquiry request from the first base station via the communication interface; and
    receive a second spectrum inquiry request from the second base station via the communication interface;
    wherein the proxy spectrum inquiry request is based on the first spectrum inquiry request and the second spectrum inquiry request.

4. The system of claim 1, where in the electronic processor is further configured to:
    determine whether at least one of the group consisting of the first base station and the second base station require reconfiguration; and
    responsive to making the determination, send a grant suspend message to at least one of the group consisting of the first base station and the second base station via the communication interface.

5. The system of claim 4, wherein the electronic processor is further configured to
    receive performance metrics for a plurality of base stations including the first and second base stations; and
    wherein determining whether at least one of the group consisting of the first base station and the second base station require reconfiguration is based on the performance metrics for the plurality of base stations.

6. The system of claim 5, wherein the performance metrics include at least one selected from the group consisting of a loading statistic, a time division duplexing configuration, and a channel interference.

7. The system of claim 6, wherein the loading statistic includes at least one selected from the group consisting of a number of idle users, a number of active users, a number of users transitioning from idle to active for a push-to-talk group call, and a distribution of resource block utilization within a cell.

8. The system of claim 4, wherein the electronic processor is further configured to:
    receive a third spectrum inquiry request from a third base station via the communication interface;

send a second proxy spectrum inquiry request, based on the third spectrum inquiry request, to the spectrum management entity via the communication interface;

receive, from the spectrum management entity via the communication interface, a second proxy spectrum inquiry response including a second spectrum allocation;

determine, based on the desired inter-cell interference coordination scheme and the second spectrum allocation, a third frequency range for a third base station; and send a third spectrum inquiry response, including the third frequency range, to the third base station via the communication interface;

wherein determining whether at least one of the group consisting of the first base station and the second base station require reconfiguration is based on at least one selected from the group consisting of the third frequency range, the desired inter-cell interference coordination scheme, a location of the first base station, a location of the second base station, and a location of the third base station.

9. A method for radio frequency spectrum interference coordination comprising:

sending a proxy spectrum inquiry request to a spectrum management entity via a communication interface;

receiving a proxy spectrum inquiry response, including a spectrum allocation, from the spectrum management entity via the communication interface;

sending a first spectrum inquiry response, including the spectrum allocation, to a first base station via the communication interface;

receiving a first grant request, including a first frequency range based on the spectrum allocation, from the first base station via the communication interface;

determining, with an electronic processor, a second spectrum inquiry response based on the first grant request;

sending the second spectrum inquiry response to a second base station via the communication interface; and determining a second frequency range based on the first frequency range and selected from the spectrum allocation;

wherein the second spectrum inquiry response includes the second frequency range.

10. The method of claim 9, further comprising:

determining a fractional frequency reuse configuration for the second base station based on the first frequency range;

wherein the second spectrum inquiry response includes the first frequency range and the fractional frequency reuse configuration.

11. The method of claim 9, further comprising:

receiving a first spectrum inquiry request from the first base station via the communication interface; and receiving a second spectrum inquiry request from the second base station via the communication interface;

wherein the proxy spectrum inquiry request is based on the first spectrum inquiry request and the second spectrum inquiry request.

12. The method of claim 9, further comprising:

determining whether at least one of the group consisting of the first base station and the second base station require reconfiguration; and responsive to making the determination, sending a grant suspend message to at least one of the group consisting of the first base station and the second base station via the communication interface.

13. The method of claim 12, further comprising:

receiving performance metrics for a plurality of base stations including the first and second base stations;

wherein determining whether at least one of the group consisting of the first base station and the second base station require reconfiguration is based on the performance metrics for the plurality of base stations.

14. The method of claim 13, wherein receiving performance metrics for a plurality of base stations includes receiving at least one selected from the group consisting of a loading statistic, a time division duplexing configuration, and a channel interference.

15. The method of claim 14, wherein receiving a loading statistic includes receiving at least one selected from the group consisting of a number of idle users, a number of active users, a number of users transitioning from idle to active for a push-to-talk group call, and a distribution of resource block utilization within a cell.

16. The method of claim 12, further comprising:

receiving a third spectrum inquiry request from a third base station via the communication interface;

sending a second proxy spectrum inquiry request, based on the third spectrum inquiry request, to the spectrum management entity via the communication interface;

receiving, from the spectrum management entity via the communication interface, a second proxy spectrum inquiry response including a second spectrum allocation;

determine, based on the desired inter-cell interference coordination scheme and the second spectrum allocation, a third frequency range for a third base station; and send a third spectrum inquiry response, including the third frequency range, to the third base station via the communication interface;

wherein determining whether at least one of the group consisting of the first base station and the second base station require reconfiguration is based on at least one selected from the group consisting of the third frequency range, the desired inter-cell interference coordination scheme, a location of the first base station, a location of the second base station, and a location of the third base station.

* * * * *